United States Patent [19]

Herbert

[11] 4,326,157
[45] Apr. 20, 1982

[54] DOUBLE INVERTER SLIP-RECOVERY AC MOTOR DRIVE WITH ASYMMETRICAL GATING PER HALF-BRIDGE

[75] Inventor: Roger B. Herbert, Williamsville, N.Y.

[73] Assignee: Westinghouse Electric Corp., Pittsburgh, Pa.

[21] Appl. No.: 139,377

[22] Filed: Apr. 8, 1980

[51] Int. Cl.³ .............................................. H02P 5/40
[52] U.S. Cl. ................................... 318/809; 318/801; 318/724
[58] Field of Search ........................... 363/71, 72, 137; 307/58; 318/801, 802, 803, 810, 729, 809

[56] References Cited

U.S. PATENT DOCUMENTS

| | | | |
|---|---|---|---|
| 3,792,286 | 2/1974 | Meier | 318/810 |
| 3,876,923 | 4/1975 | Humphrey et al. | 363/137 |
| 3,979,662 | 9/1976 | Klein | 363/71 |
| 4,020,411 | 4/1977 | Tsuboi et al. | 307/58 |
| 4,225,914 | 9/1980 | Hirata et al. | 363/71 |

OTHER PUBLICATIONS

Miljanic, P. N. "The Through-Pass Invertor & Its Application to Speed Control of Wound Rotor Induction Machines" *IEEE* Transactions on Power Apparatus and Systems, Jan. 68, pp. 234–237.

*Primary Examiner*—David Smith, Jr.
*Attorney, Agent, or Firm*—C. M. Lorin

[57] ABSTRACT

A slip-recovery AC motor drive includes two inverters connected in series between the DC link terminals derived from the rectifier coupled with the rotor, and the thyristors are controlled asymmetrically between pairs of half-bridges pertaining to different inverters, thereby to by-pass the output of one inverter alternately during successive equal time intervals of conduction. The recovery transformer has two secondaries each connected to a corresponding inverter output.

12 Claims, 39 Drawing Figures

0° FIRING ANGLE

30° FIRING ANGLE

60° FIRING ANGLE

90° FIRING ANGLE

120° FIRING ANGLE

150° FIRING ANGLE

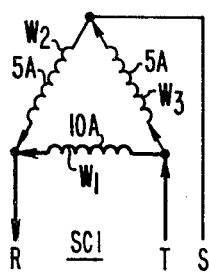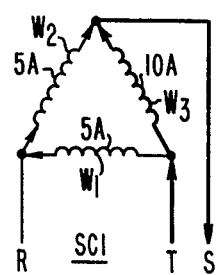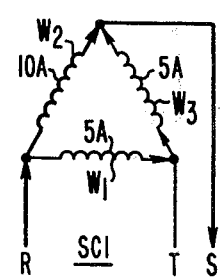
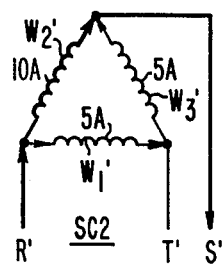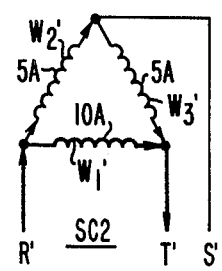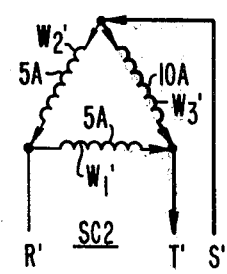
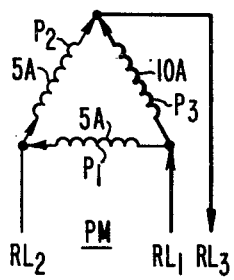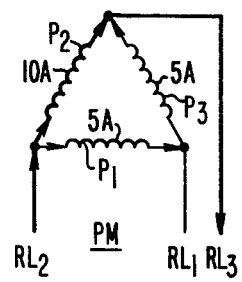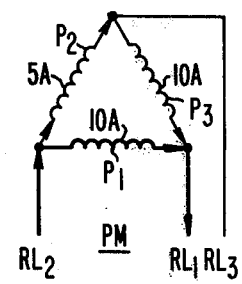
FIG. 19A  FIG. 19B  FIG. 19C

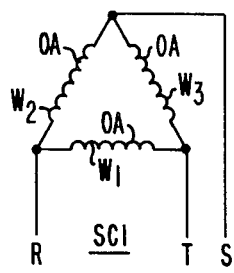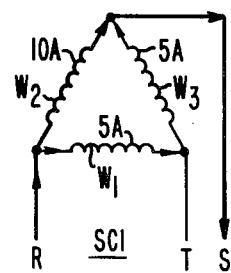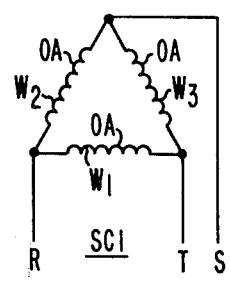
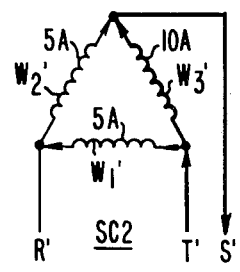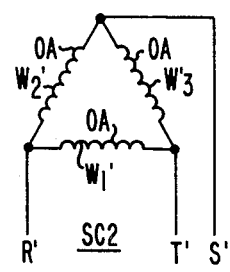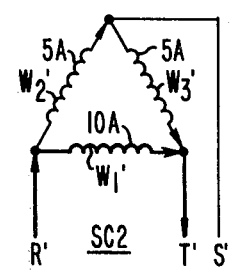
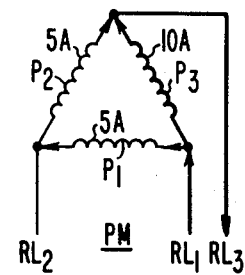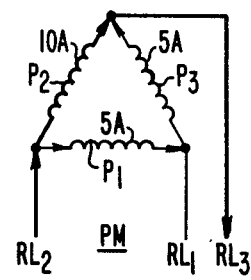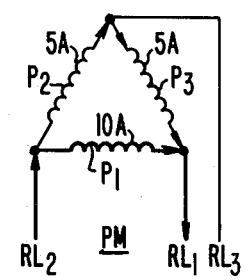
FIG. 20A  FIG. 20B  FIG. 20C

DOUBLE INVERTER SLIP-RECOVERY AC MOTOR DRIVE WITH ASYMMETRICAL GATING PER HALF-BRIDGE

BACKGROUND OF THE INVENTION

The invention relates to AC motor drive control, in general, and in particular to static slip-recovery drives.

Static slip-recovery drives are known and have been found to be advantageous for many specific applications. Slip-recovery is a technique generally used with an induction motor of the wound-rotor type. With this type of motor, definite advantages obtain as contracted with the conventional squirrel cage induction motor, for instance. Thus, when a variable voltage, variable frequency AC power supply is not available, or such complexity is not desired, a variable speed drive can be achieved by controlling the rotor current. This approach which involves a controlled return to the network of the energy not used by the load, has been known with an additional machine as the Scherbius system, or as the Kramer system. With the advent of SCR power switches, control of the rotor current and slip-recovery have been practiced statically. The method consists in rectifying the AC current induced as secondary in the rotor of the motor and in creating in the DC link a counter-electromagnetic-force voltage, opposed to the rectified DC voltage, through coupling of an inverter between the AC power supply and the DC link from the rotor. SCR control provides speed and torque control of a wound-rotor motor having a stator powered from a constant voltage fixed frequency source. See for instance "Principles of Inverter Circuits" by B. D. Bedford and R. G. Hoft, page 404, FIG. 1154, John Wiley 1964. See also: Proc. IEE, Vol. 110, No. 8, August 1963, "Switching Drive of Induction Motors" by M. S. Erlicki and Y. Wallach, pp. 1441-1450; IEEE transactions PAS-85, No. 1, January 1966, "Inverter Motor Speed Control With Static Inverters in the Rotor", pp. 76–84; and IEEE transactions IGA-5, No. 1, Jan./Feb., 1969, "Slip Power Recovery in an Induction Motor by the Use of a Thyristor Inverter" by William Shepherd and Jack Stanway, pp. 74–82.

The static drive of the type described in this prior art is similar in many ways to a DC motor drive and can be used to control the speed of a wound-rotor AC induction motor. The AC current of the rotor is rectified and passed through the thyristor inverter. Ultimately, the rotor power is fed back into the AC line of the network. Generally, a transformer is used to couple the AC side of the inverter to the network. The motor is controlled by controlling the gating angle of the thyristors, therefore, the back EMF introduced in the DC link by the inverter, and ultimately the current in the rotor. In other words, by controlling the DC link voltage, the DC link current is controlled and, thus the AC current in the wound-rotor. Accordingly, the torque is being controlled. The regulator of such slip-recovery system includes two nested loops: a current inner loop and a speed outer loop.

Such motor drives are particularly useful for pump and fan drives, since these generally operate at a predetermined constant speed. However, motor operation is not continuous and there is a frequency cycling from zero speed to full speed and back. Such abrupt changes in and out of normal operation are extremely unfavorable in several respects.

With the slip-recovery drive, the power factor is worst at full speed. Moreover, the transformer experiences overheating with the current reflected back into the AC line, unless it is designed for a higher rating, which, however, entails a bulky and costly structure. While power factor correction can be successfully achieved for a given speed, recurrent changes in speed makes such correction less effective at speeds other than the designed speed.

Accordingly, an object of the present invention is to control a wound-rotor induction motor through a wide range of speed while maintaining a good power factor at substantially all speeds.

Another object of the present invention is to minimize losses in the transformer, associated with the inverter and the power supply, which is inserted in the slip-recovery loop of a wound-rotor induction motor drive system.

Still another object of the present invention is to minimize reactive power in a wide range of speed with a slip-recovery induction motor drive system.

A further object of the present invention is to reduce the filtering requirements in the DC link of a slip-recovery induction motor drive system.

SUMMARY OF THE INVENTION

In accordance with the present invention, a slip-recovery induction motor drive system includes two inverters in series with the DC link and a twin secondary transformer for coupling the respective inverters with the AC power supply applied to the stator of the induction motor.

By employing two secondary windings on the transformer, each connected to a separate inverter, the rating of the overall transformer is reduced. Moreover, each inverter supports only half of the rotor voltage. Despite the complexity of doubling the secondary of the transformer an important cost reduction and improved efficiency for the wound rotor AC motor drive obtains with the particular way the inverters are controlled according to the present invention.

An essential feature of the present invention is to control the two inverters by controlling halves belonging to two different inverters and asymmetrically from one pair of halves to the other so as to regulate speed and torque while minimizing the reactive current component which is reflected back through the transformer into the network. The two windings are identical and closely associated on a common iron core for maximum mutual inductance, and the common primary winding is disposed on the iron core in such a way as to see both secondary windings equally.

It is known how to combine two inverter bridges controlled independently and asymmetrically in order to improve the power factor of the AC network in a DC/AC power converter. See for instance: IEEE Vol. IA-8, No. 3, May/June 1972, "A Study of Symmetrical Firing for Phase-Controlled Converters" by William McMurray.

It is also known from Electronics Letters (25th June 1970) Vol. 6, No. 13, pp. 399–401, "Electronic Mode of Control to Obtain Increased Torque and Improved Power Factor From an Asynchronous Machine" by J. D. VanWyk.

Fundamental distinctions and specific improvements over the referred prior art which are inherent in the wound-rotor AC motor drive system according to the present invention as can be seen from a consideration of the preferred embodiment described hereinafter.

BRIEF DESCRIPTION OF THE DRAWINGS

FIGS. 19A–C illustrates the current distribution between the windings of the transformer when the thyristors are controlled in the "per bridge" mode; and FIGS. 20A–C illustrates the by-pass effect on each secondary winding of the transformer one at a time, occurring when the thyristors are controlled in the "per half-bridge" mode.

DESCRIPTION OF THE PREFERRED EMBODIMENT

Figure 1:
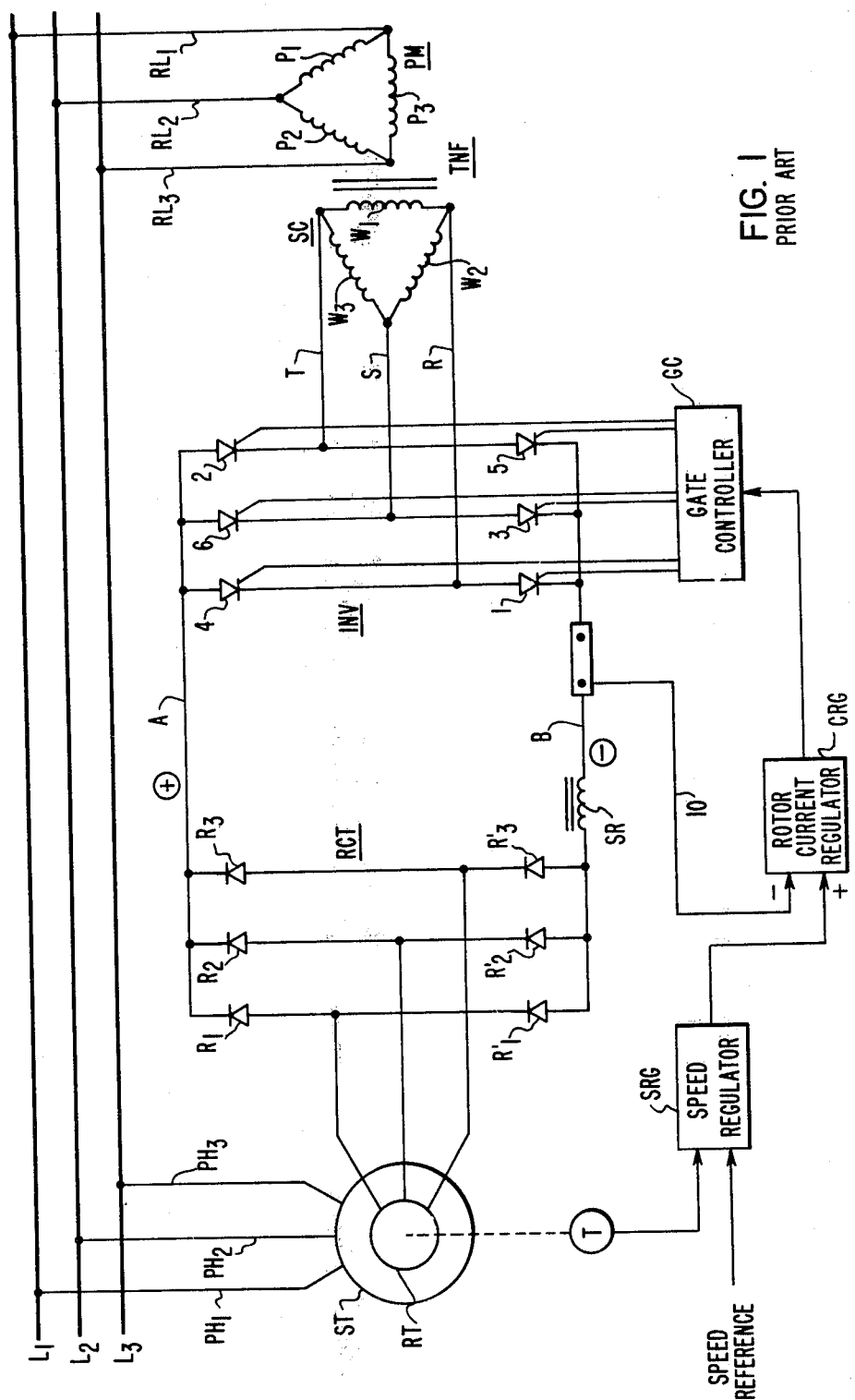
FIG. 1 shows a wound-rotor induction motor drive of the prior art, namely one having a rectifier bridge connected at the output of the rotor and one inverter bridge interposed between the DC link and the AC power supply for applying the slip-recovery technique.

Referring to FIG. 1, the static slip-recovery technique of the prior art which, with the advent of thyristors, or SCR power switches, has replaced the Scherbius and Kramer commutatorless machines, will be first described.

FIG. 1 shows a wound-rotor motor having a stator ST supplied, on phase lines PH1, PH2, PH3, with AC current from bus lines $L_1$, $L_2$, $L_3$ of the AC power network. The rotor RT has its three phases connected into a rectifier bridge RCT consisting of six rectifier devices $R_1$–$R_3$, and $R_1'$–$R_3'$ for the positive and negative polarities, respectively. The DC link consists of a positive terminal A and a negative terminal B. It includes a smoothing reactor SR, a shunt SH which is part of a DC current sensing circuit outputting on line 10 a current representative signal for regulation purpose. Between terminals A and B is connected a six-thyristor inverter INV. The thyristors (1–6) are naturally commutated from lines, R, S, T associated with the junction points of three respective pairs of series-connected thyristors (4,1); (6,3) and (2,5). Lines R, S, T are the secondary terminals of a transformer TNF having a secondary winding SC and a primary winding PM energized by bus lines $L_1$, $L_2$, $L_3$ via lines $RL_1$, $RL_2$, $RL_3$, respectively. The windings are illustratively shown as delta windings. The thyristors are gated by a gate controller GC which is part of an outer control loop including (1) a speed regulator SRG responsive to actual speed from tachometer T and to a speed reference signal, and (2) a current controller CRG responsive to the speed regulator output and to the signal of line 10, for establishing a controlling error signal.

Such a static drive is similar in many ways to a DC motor drive and can be used to control the speed of the wound-rotor motor by controlling the firing angle of the thyristors of the inverter INV. When the basic regulator composed of SRG and CRG establishes the gating angle determined by gate controller GC, the back EMF in the DC link AB of the inverter controls the rotor current and therefore the motor torque, thus, motor speed.

Figure 2A:
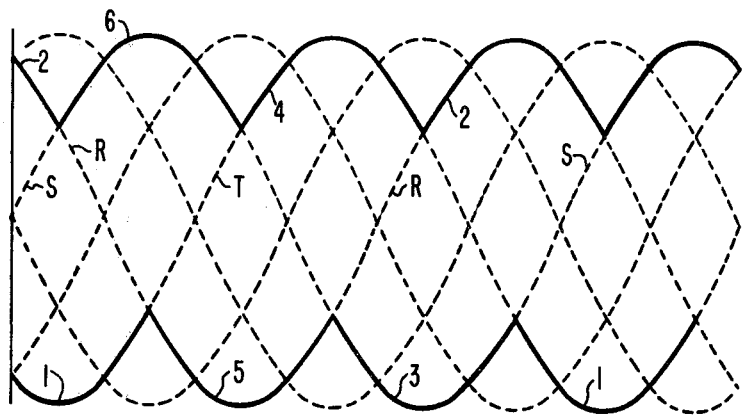
FIGS. 2A–2F show the inverter bridge voltage in the rectifying and the inverting domains at firing angles of 0°, 30°, 60°, 90°, 120° and 150° firing angles.
Figure 2B:
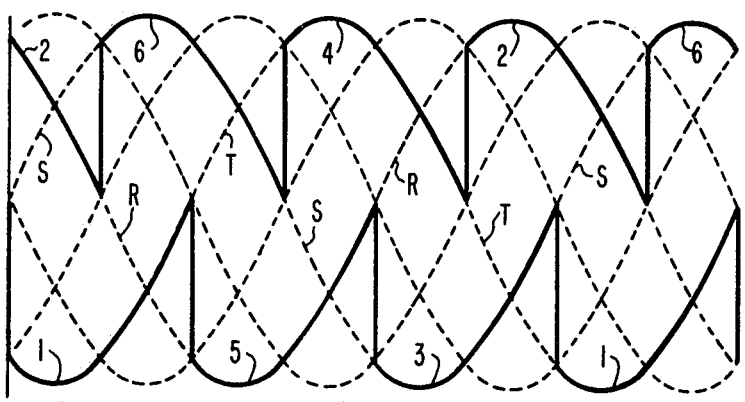
Figure 2C:
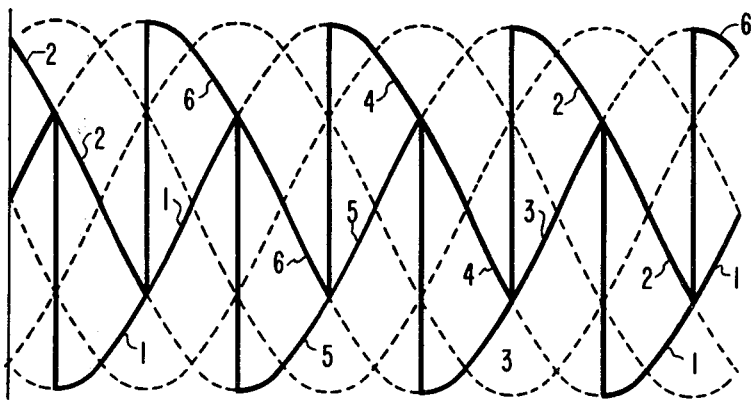
Figure 2D:
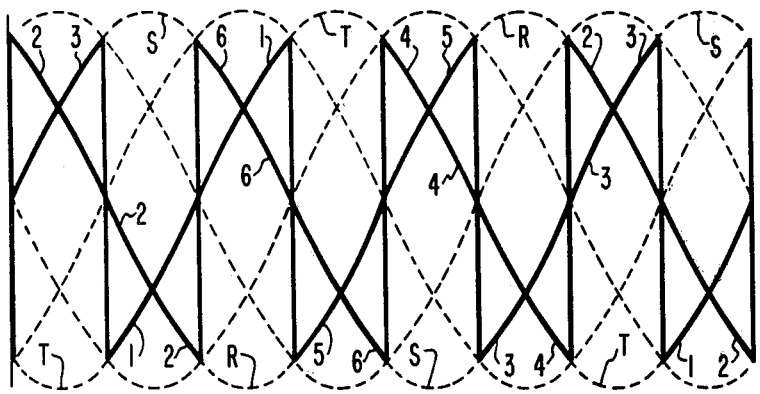
Figure 3:
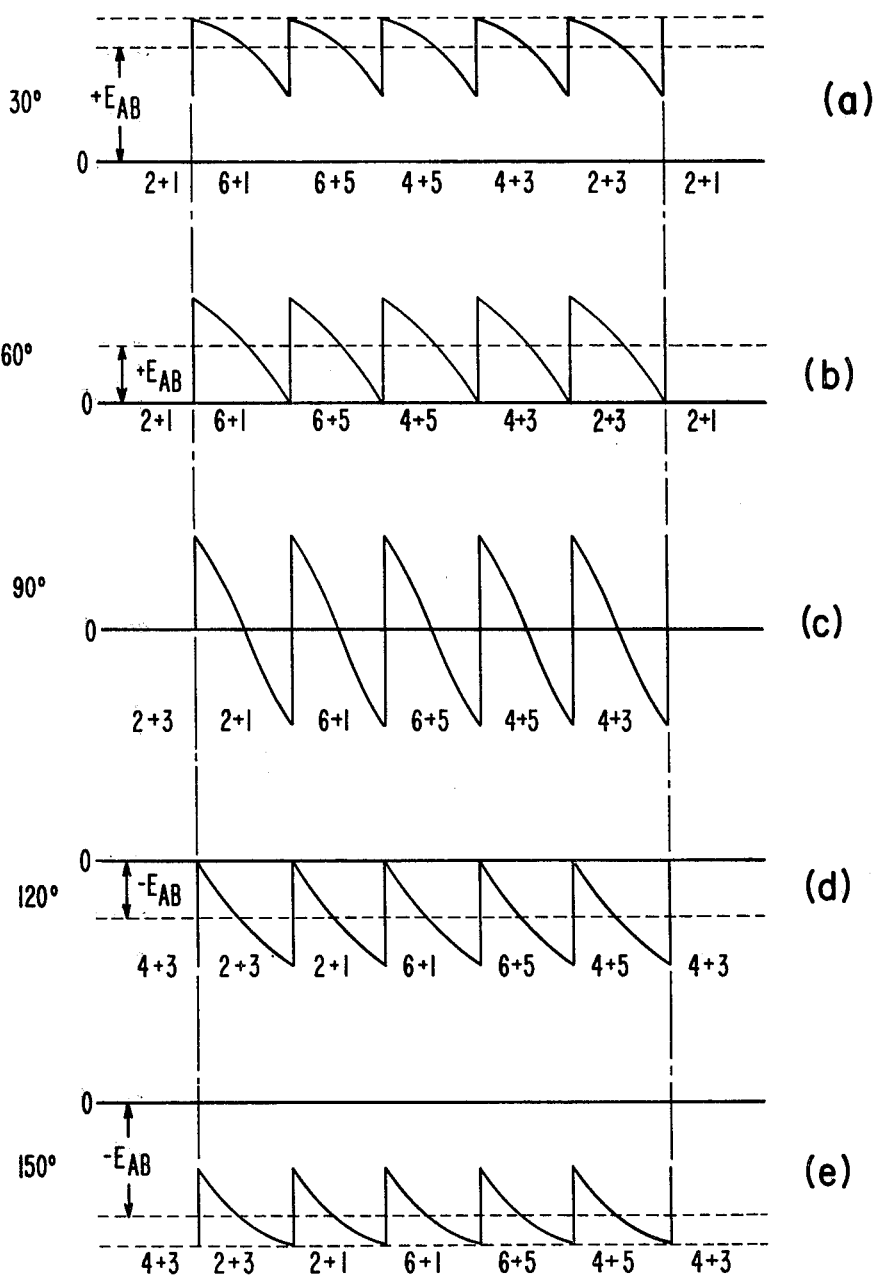
FIG. 3 provides curves illustrating the DC link voltage for 30°, 60°, 90°, 120°, and 150°, successively.

The inverter, which pumps the rotor power (after rectification) back into the AC lines, $L_1$, $L_2$, $L_3$ via transformer TNF, can be regarded as a network of static controlled switches (six in all) under natural commutation between the AC lines $RL_1$, $RL_2$, $RL_3$ and the DC link AB. By closing each switch at the right point in time, the average DC voltage of the DC link between terminal AB can be controlled. When the gating angle, which is the point in time at which the switch under natural commutation is turned ON, is zero degree, the output voltage $E_{AB}$ is maximum as shown in FIG. 2A. Power flows from the AC line to the DC link. As the gating angle is retarded, the output voltage decreases as shown for 30° in FIG. 2B and curve (a) of FIG. 3, or as shown for 60° in FIG. 2C and curve (b) of FIG. 3. At 90 degrees, the average output voltage $E_{AB}$ is zero as shown in FIG. 2D and curve (c) of FIG. 3.

Figure 2E:
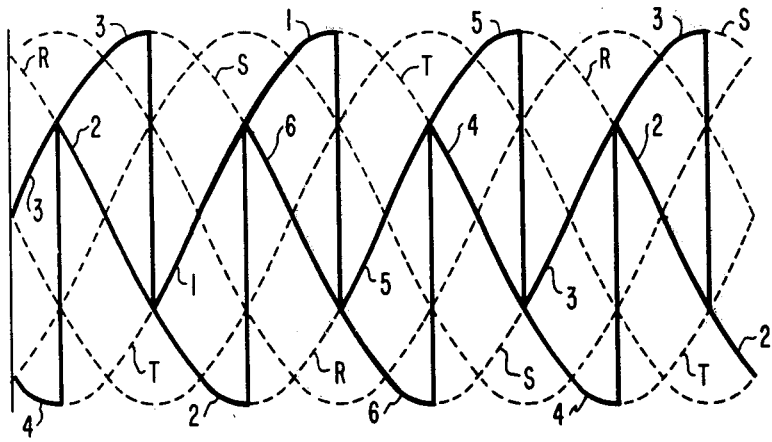
Figure 2F:
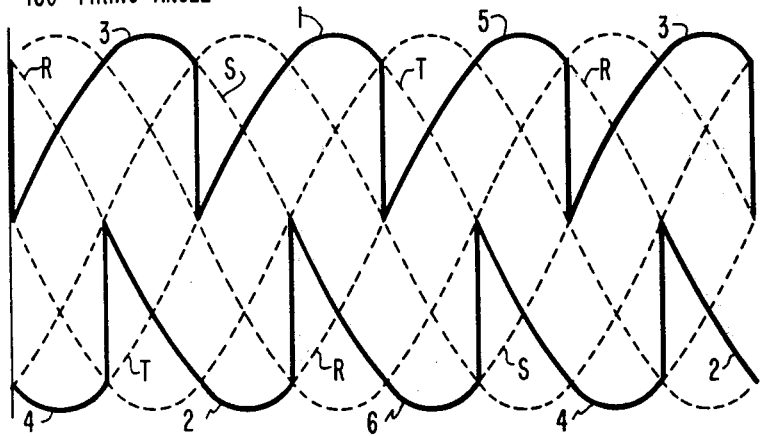

As the firing angle exceeds 90°, being more and more retarded, the output voltage goes negative and increases in absolute value until a maximum negative voltage $-E_{AB}$ is reached for 180° delay. This fact is illustrated in FIG. 2E and curve (d) of FIG. 3 for 120°. It is illustrated in FIG. 2F and curve (e) of FIG. 3 for 150°. At negative output voltage, current will flow only if the DC voltage source as seen from the rectifier bridge RCT is greater than the inverter output. In such case, power will flow from the motor rotor side through the inverter, which converts the DC current into AC current, and by the transformer TNF the energy is fed back to the AC lines $L_1$, $L_2$, $L_3$. This is the well known slip-recovery technique of a wound-rotor induction motor. It appears that the inverter INV may be either converting or inverting, depending upon the direction of power.

Figure 4:
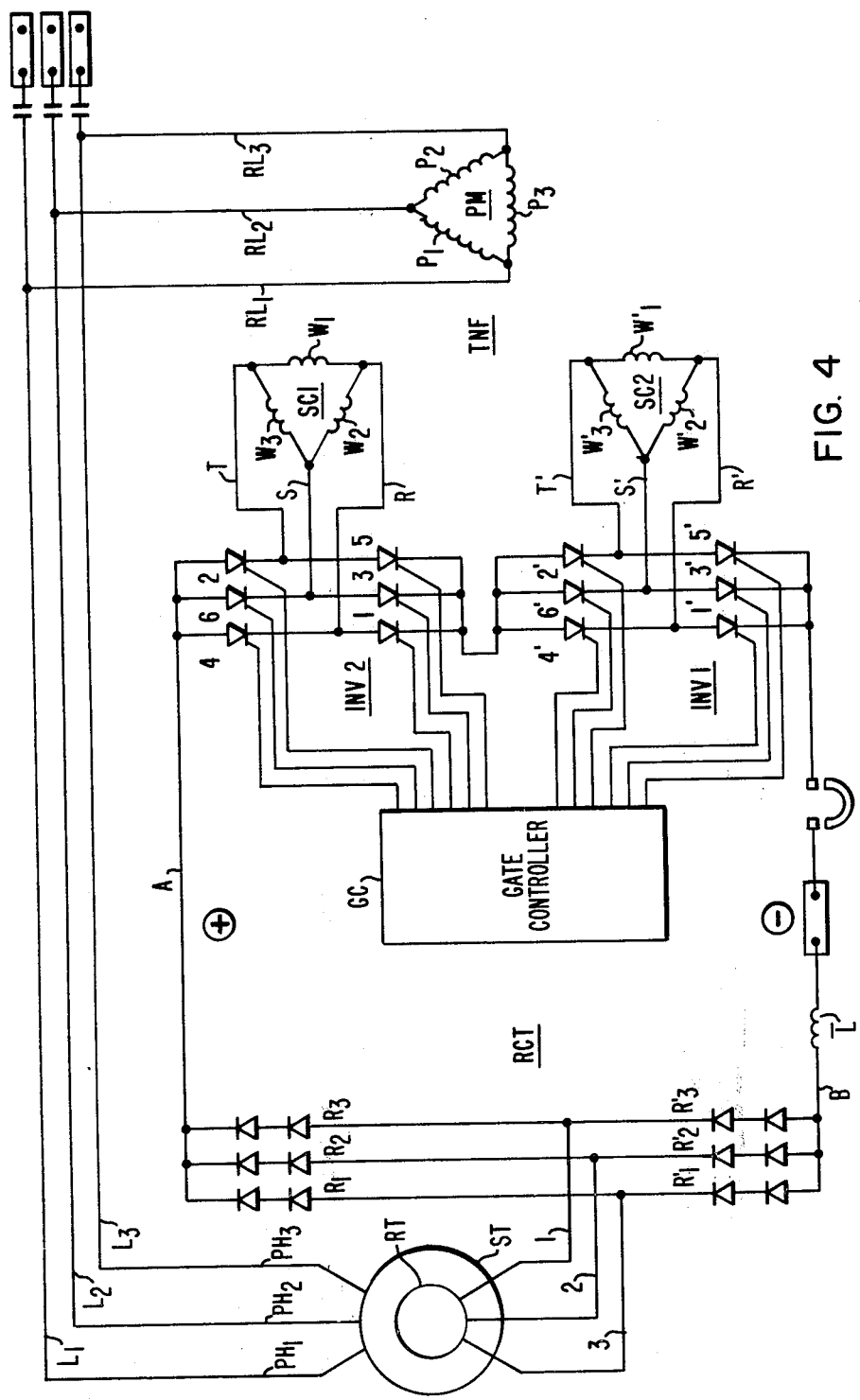
FIG. 4 shows the wound-rotor AC motor drive system according to the present invention, namely including two inverters in series in the DC link of the rectifier bridge associated with the wound-rotor and coupled with two separate secondaries of the slip-recovery transformer.

Referring to FIG. 4, the wound-rotor motor drive system according to the present invention appears to include two inverters $INV_1$ and $INV_2$ instead of one, and the transformer TNF has two separate secondaries $SC_1$, $SC_2$ associated with the respective inverters $INV_1$ and $INV_2$. A further distinction over the motor drive of FIG. 1 lies in the mode of gating the two inverters $INV_1$ and $INV_2$ in order to control torque and speed between zero speed and full speed. The advantages and superiority of the motor drive system of FIG. 4 over the one of FIG. 1 will appear from a comparative discussion of speed control in either instances, by reference to FIGS. 5 and 6.

Figure 5:
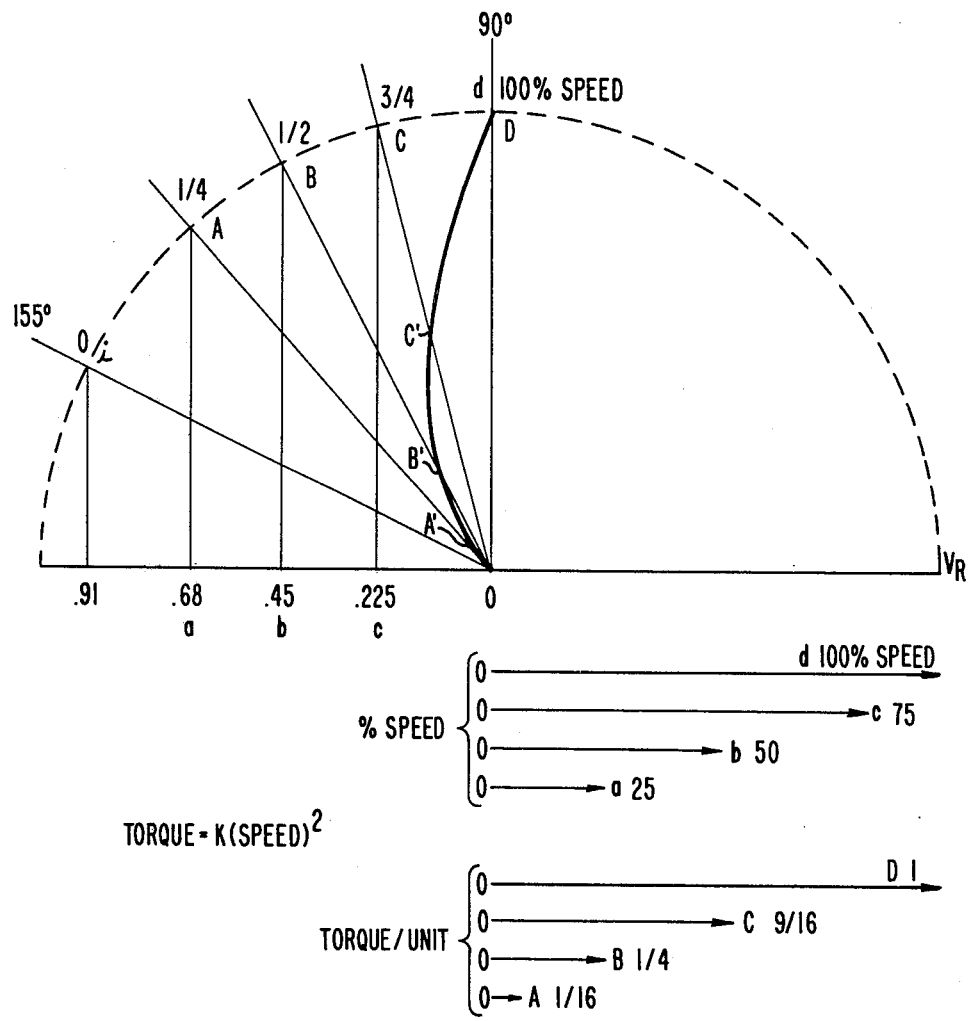
FIG. 5 is a circular diagram illustrating the operation of a fan motor drive like in FIG. 1 for full speed, ¾ speed, ½ speed and ¼ speed.

Referring to FIG. 5, the circular diagram for 180° of control of the thyristors of inverter INV of FIG. 1 will be explained in terms of motor speed, torque, slip-ring voltage and rotor current by reference to the active power axis, toward the left of the abscissa axis and to the reactive power axis, vertically and upward.

Figure 7:
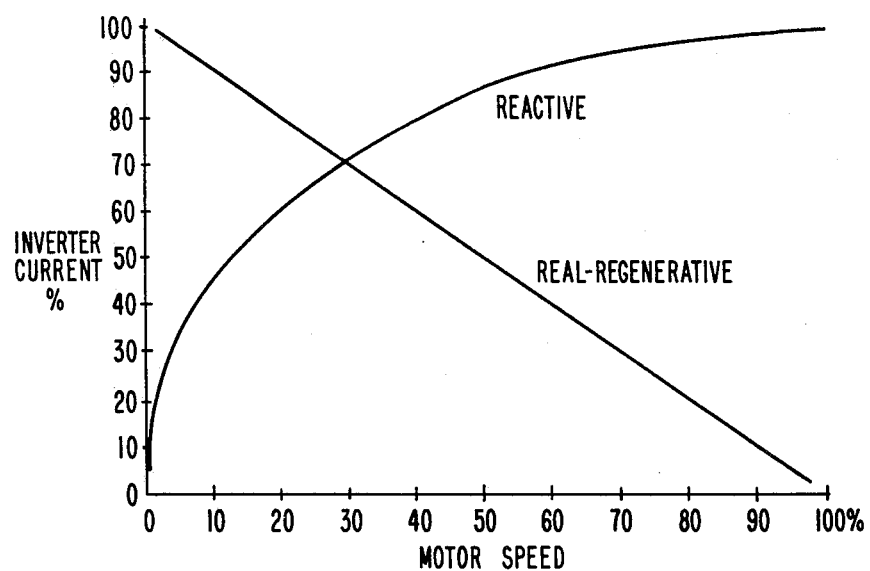
FIG. 7 shows the current v. speed characteristic of a constant torque AC slip-recovery motor drive of the prior art.

FIG. 7 shows the current v. speed characteristic of an induction motor under constant torque. At zero speed, the real (or in phase) current in the rotor is at its maximum, whereas at 100% speed the real current is zero. The illustrated real current v. speed curve is linear under the assumption torque=constant. Reactive current is a second degree curve, as shown, with zero reactive current at zero speed, and maximum current at 100% speed, with a tendency to be close to the maximum already at 50% speed.

Figure 8:
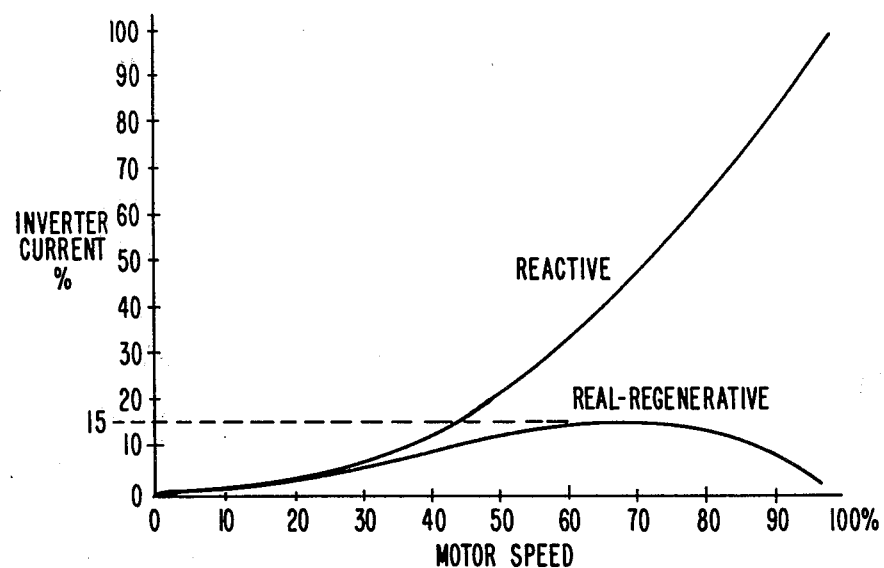
FIG. 8 is the current v. speed characteristic peculiar to a fan load type of installation of the prior art.

FIG. 8 shows what become the characteristics of FIG. 7 in the context of a fan load. In such case at 100% speed the real power falls again to zero while reactive power becomes very large, the relation between torque and speed being such that the torque increases as the square of the speed.

FIG. 5 is assumed to correspond to a load like the one of FIG. 8. In practice, the firing angle of the thyristors of the inverter cannot be controlled as far back as 180°. 155° is the largest practical delay in the thyristor angle. It corresponds to the operative point (i) on the circle, and represents zero speed. At this point the maximum active power is obtained, namely on the horizontal axis. On a per-unit basis, e.g. unity for the full radius, cos 155°=0.91 which is represented on the horizontal axis as a fraction of the half-diameter. Moreover, points a, b, c, are projections on the horizontal axis for angular positions on the circle corresponding to $\frac{3}{4}$, $\frac{1}{2}$ and $\frac{1}{4}$ the value of 0.91 (0.91 being for zero speed). Thus, the vectors having their tips at points A, B, C on the circle represent the operating angles at $\frac{1}{4}$, $\frac{1}{2}$ and $\frac{3}{4}$ speed. At 90° (namely, for point D on the vertical), or 100% speed, the power reflected back from the DC link AB through the inverter is all reactive. In accordance with the load characteristics of FIG. 8, a curve OA', B', C', D' intersecting vectors OI, OA, OB, OC and OD is shown characterizing the current vectors when the motor drive of FIG. 1 passes from zero speed to full speed. Vectors OA', OB', OC', OD' correspond to the absolute values per unit of the torque at the various speeds following the relation between speed and torque represented by FIG. 8, e.g., a fan load rather than a constant torque load. The per-unit values are in relation to the value of $E_{AB}$ at maximum value, namely when the blocked rotor voltage $V_R$ is derived between the slip rings, e.g. as shown along the abscissa axis to the right on FIG. 5. At any particular speed $V_R$ is the voltage between DC terminals A and B as seen from the rectifier unit RCT, and $E_{AB}$ is the counter electromotive voltage provided by the inverter INV. In the particular situation when the firing angle of the inverter INV is 155°, the counter electromotive voltage $E_{AB}$ becomes equal and opposite to $V_R$ which at this time, represent the blocked rotor voltage of the motor.

Figure 6:
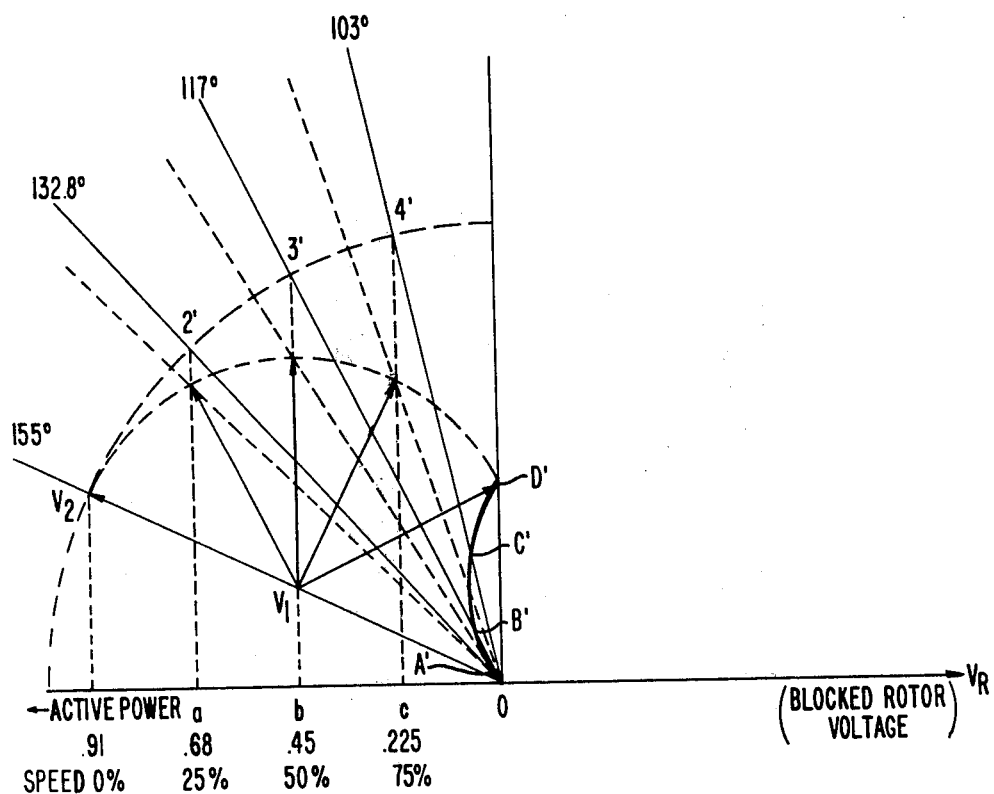
FIG. 6 is a circular diagram like the one of FIG. 5 in the context of the motor drive system of FIG. 4.

Referring to FIG. 6, the circular diagram of FIG. 5 has been modified in order to take into account the fact that in FIG. 4 two thyristor bridges $INV_1$, $INV_2$, connected in series, are now replacing inverter INV of FIG. 1. It is assumed again that 155° is the maximum angle of retardation practical when controlling. When the two inverters $INV_1$, $INV_2$ are both gated at 155°, the two voltages $V_1$ and $V_2$ being added in series, vectors $V_1$ and $V_2$ add vectorially thereby to lie like vector $O_i$ in the case of FIG. 5. The operative point is shown as 01 on the circular diagram. In accordance with the present invention, inverter $INV_1$ is kept at 155° retardation, while inverter $INV_2$ is controlled with reduced retardation as would have been done with the single inverter INV of FIG. 1. In the process, vector $V_2$ will be rotating in the diagram plane about the tip of vector $V_1$ so as to occupy successively positions passing by $V_12$, $V_13$, $V_14$ and $V_15$, which correspond in projection on the horizontal axis to active powers representing $\frac{3}{4}$ (point a), $\frac{1}{2}$ (point b), $\frac{1}{4}$ (point c) and zero active power, namely, for $\frac{1}{4}$ speed, $\frac{1}{2}$ speed, $\frac{3}{4}$ speed and 100% speed respectively, like in the instance of the diagram of FIG. 5.

The following Table indicates the thyristor firing angles assuming, like in FIG. 5, that $V_R$ is unity for blocked rotor voltage (zero speed) at 155° retardation. Like in FIG. 5, cos 155°=0.91 corresponds to zero speed.

TABLE

| | Rotor Speed | $INV_1$ | $INV_2$ | (Vector $V_2$ Angular Positions) | $INV_1 + INV_2$ Cumulative |
|---|---|---|---|---|---|
| 1 | 0 | 155° | 155° | 0° | 155° |
| 2 | 25 | 155° | 117° | 52° | 132° |
| 3 | 50 | 155° | 90° | 65° | 117° |
| 4 | 75 | 155° | 63° | 90° | 103° |
| 5 | 100 | 155° | 25° | 130° | 90° |

Vectors 01, 02, 03, 04 and 05, are the vectorial sums of $V_1 + V_2$ under the effect of inverters $INV_1$ and $INV_2$. It appears that in projection on the vertical axis representing reactive power, the reactive component is maximum when the vector caused by inverter $INV_2$ is at 90°, thus parallel to the vertical axis. This is shown by vector $V_13$. Beyond position 3, the reactive component decreases. This is the immediate result of the concept of installing two inverters rather than one. A direct consequence is an improved power factor toward full speed.

Figure 9:
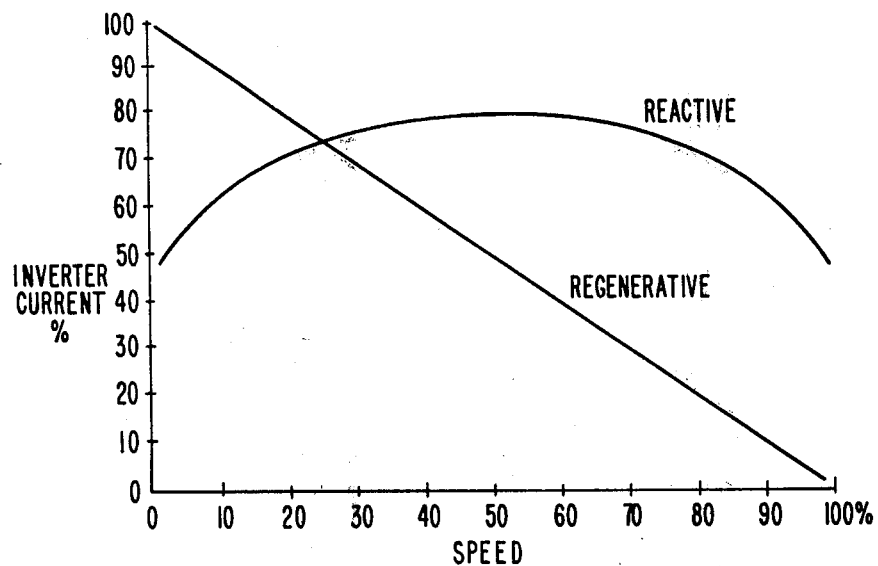
FIG. 9 shows the current v. speed characteristic of FIG. 7 as modified in the case of an asymmetrical gating in accordance with the invention.
Figure 10:
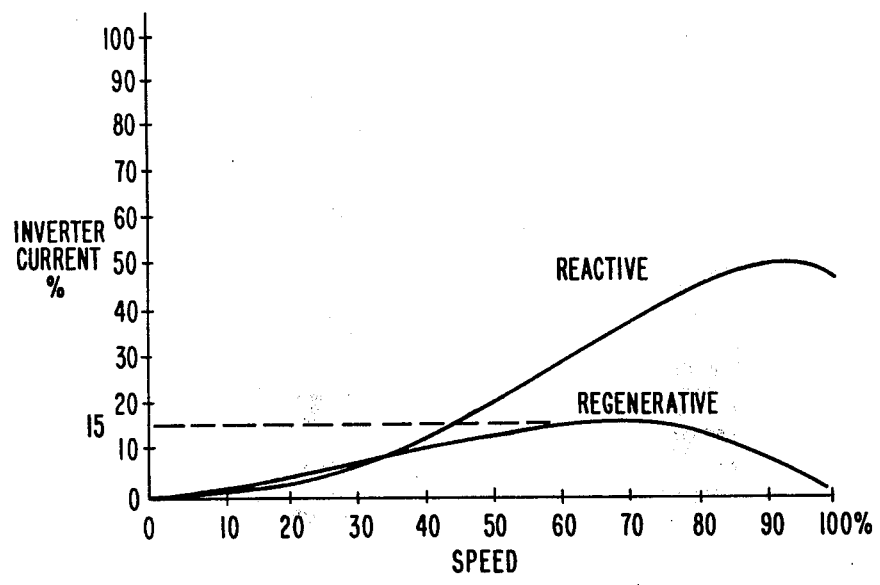
FIG. 10 shows the current v. speed characteristic of FIG. 8 modified as a result of asymmetrical gating in accordance with the invention.

With one inverter as in FIG. 1, at starting condition the inverter current is mostly real and regenerative, but there is a component of imaginary or reactive current representing about 35% of the total. At half speed, the angle is about 120 degrees (exactly 117°) with 87% of reactive current and still a 50% component which is regenerative. At full speed, the gating angle is 90° and the inverter current is entirely reactive, thus, with zero regenerative current. This is shown by FIG. 7. In the case of two inverters, e.g., in the instance of FIG. 4, which are asymmetrically controlled, as shown in FIG. 6, the reactive power is decreased at high speed by the angular position of the operative vector of one inverter being controlled to rotate about the tip of the constant operative vector of the other inverter. As a result, as shown in FIG. 9, reactive power is much more constant over the entire control range and does not expand to a large magnitude at high speed like in the instance of FIG. 7, as in the situation of a fan load (like in FIG. 8), where the reactive power component varies considerably between zero speed and full speed, in fact exponentially. With two inverters asymmetrically controlled the load characteristics of a fan become the one of FIG. 10, showing that at speeds above 90° firing angle for inverter $INV_2$, reactive power reduces itself somewhat instead of increasing further like in the instance of FIG. 8.

The preceding considerations show the definite superiority of asymmetrical gating over symmetrical gating. The KVARS reflected back into the network lines stay much more constant over a wide range of speed. Since power factor correction with capacitors is only effective at one particular reactive power level, correction can now be effected which will effectively improve the power factor along the entire speed range. Also, while with slip-recovery systems, the power factor was worst at full speed, this is no longer the case with two inverters controlled asymmetrically as explained therein.

Figure 11:
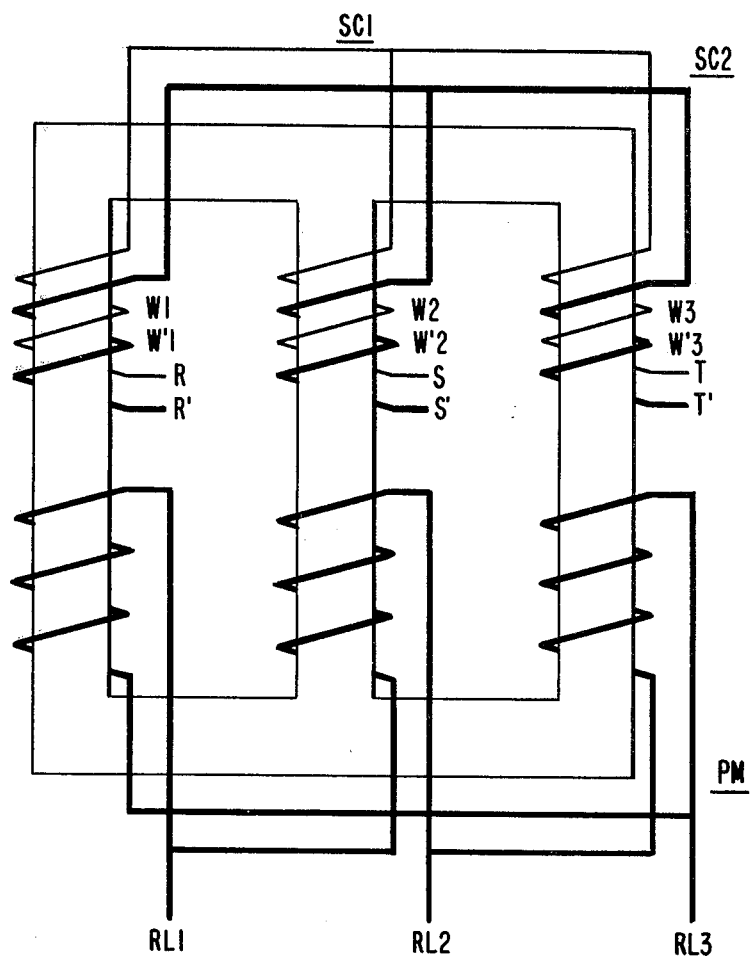
FIG. 11 typically shows the primary and secondary windings of a transformer and the iron core, as designed for installation in a slip-recovery motor drive system according to the present invention.

A second benefit lies in the fact that transformer TNF can be reduced to about 70% of the KVA rating otherwise required. When the rotor voltage is high while one inverter ($INV_1$) supports the full rotor voltage, the other ($INV_2$), depending upon the controlling angle, might support only a fraction of it. At any rate, the loading as seen from the transformer secondary is divided between the two secondaries SC1, SC2 having windings ($W_1$, $W_2$, $W_3$) and ($W'_1$, $W'_2$, $W'_3$), respectively. To this effect, the two secondaries are made identical and tightly coupled on a common iron. Such a transformer is illustrated in FIG. 11 where, for the sake of clarity, the secondaries are assumed to be wound in Y and the primary in delta. The two secondary currents in each phase are reflected into the primary PM by flux effect. A smaller transformer and less costly transformer can therefore be used than in the case of the prior art. This is most easily appreciated by comparing vector OD in FIG. 5 to vector O5 in FIG. 6. The improvement is clearly evidenced by points 1-5 which are low for the tip of vector $V_2$ as opposed to related points 1'-5' on the larger circle of radius $V_1+V_2$. This is concretized by curve A', B', C', D' which is substantially smaller in FIG. 6 than in FIG. 5. In addition, as evidenced by the vectorial relation of $V_1$ and $V_2$, the currents in the two secondaries are shifted in phase relative to one another. Partial cancellation of the currents as reflected into the primary results. Other reasons why the transformer is of lower rating will appear from the description hereinafter.

FIG. 4 shows one embodiment in which two inverters $INV_1$ and $INV_2$ are being controlled asymmetrically from one inverter to the other. One inverter ($INV_1$) is fully retarded, (at 155° for practicality), while the other ($INV_2$) is controlled anywhere between 155° and 0°.

Figure 12:
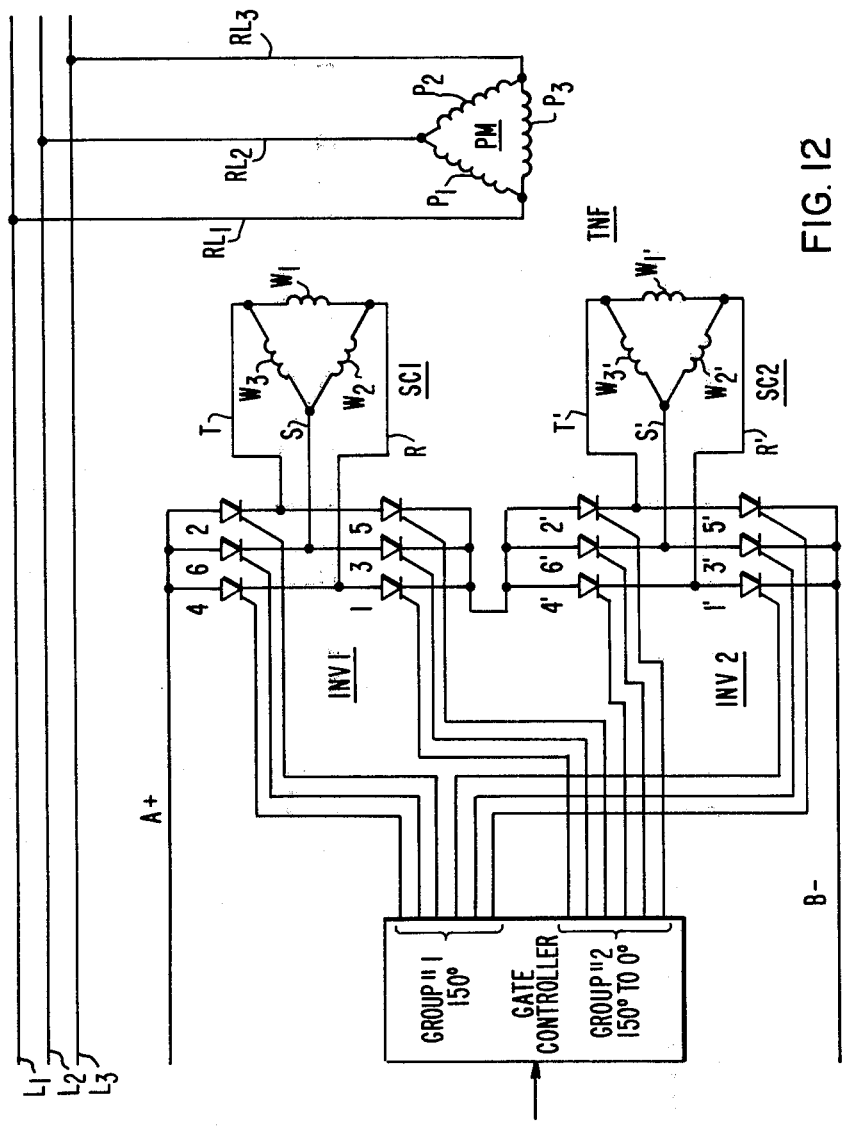
FIG. 12 shows the two inverter bridges and the associated transformer of FIG. 4 with asymmetric gating performed in a "per half-bridge" fashion.

FIG. 12 shows another embodiment in which the two inverters are controlled by controlling at 150° two sets of thyristors belonging to different bridges $INV_1$, $INV_2$, the other two sets of thyristors being controlled at an angle varying between 150° and 0°. The latter mode of control will be referred to hereinafter as a "per half-bridge mode", in contrast to the "per bridge mode" described heretofore by reference to FIG. 4.

Referring to FIG. 12, the motor drive system of FIG. 4 is shown illustratively with thyristors 4, 6, 2 of inverter $INV_1$ being controlled at 150° together with thyristors 1', 3', 5' of inverter $INV_2$ (group #1), while thyristors 1, 3, 5 of $INV_1$ are controlled together with thyristors 4', 6', 2' of $INV_2$ at a variable angle (group #2).

Figure 13:
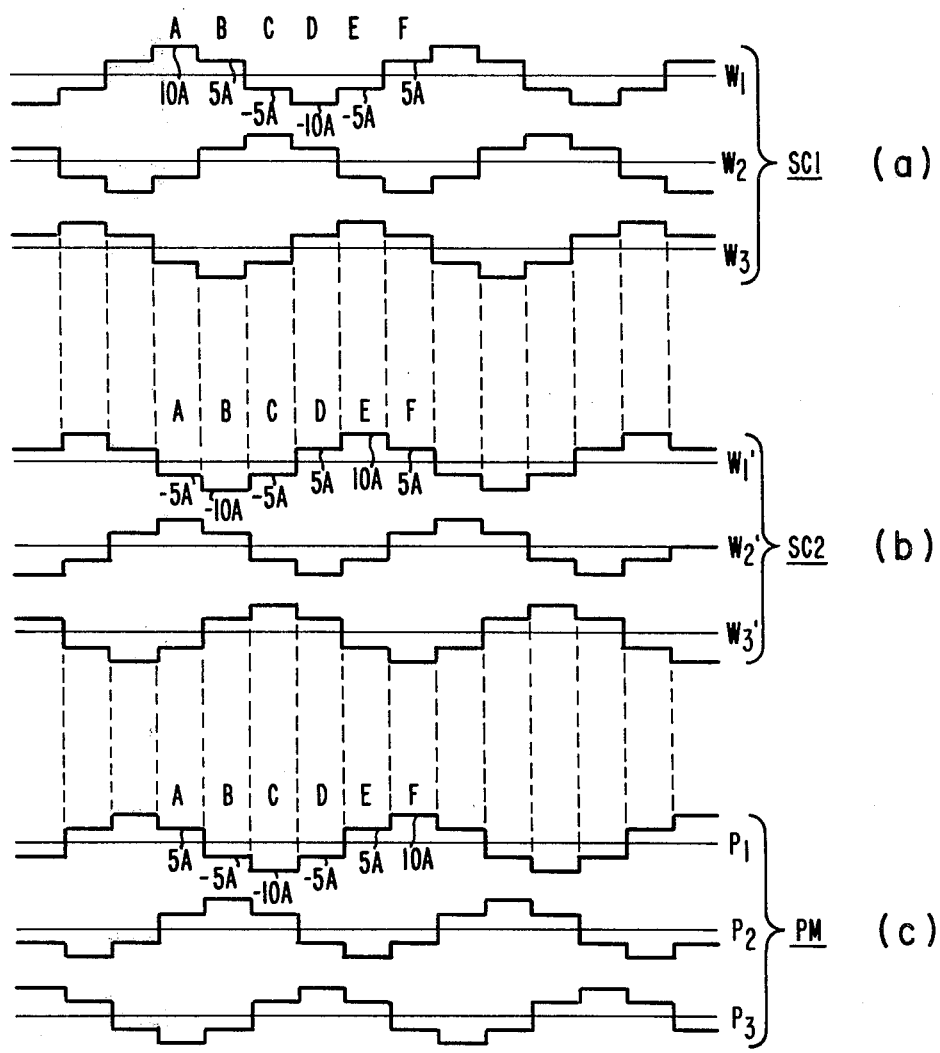
FIG. 13 shows the waveforms of the secondary and primary currents of the transformer in the instance of FIG. 5, for 150° and 30° asymmetrical gating in a "per bridge" fashion.

Referring to FIG. 13, the secondary currents in secondaries SC1, SC2 of the transformer are shown by curves (a) and (b), while curves (c) represent the currents in the primary PM, when the motor drive is controlled in the "per bridge mode", as earlier explained by reference to FIG. 4.

Figure 14:
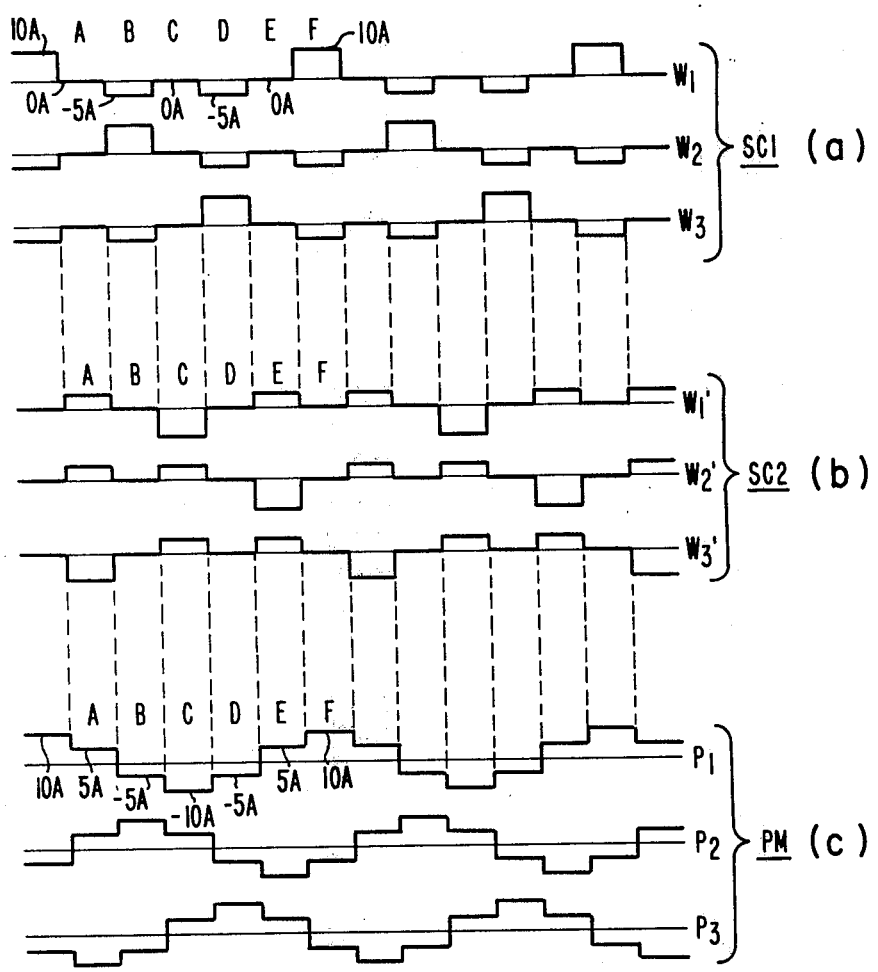
FIG. 14 shows the waveforms of the secondary and primary currents of the transformer in the instance of FIG. 12, for 150° and 30° asymmetrical gating in a "per half-bridge" fashion.

Referring to FIG. 14, the secondary currents in SC1 and SC2 are shown by curves (a) and (b) when the inverter $INV_1$ and $INV_2$ are controlled in the "per half-bridge mode" in accordance with the scheme of FIG. 12. The same curves (c) obtain as in FIG. 13.

It is acknowledged that asymmetrical firing of thyristors between different static controlled converters for power factor correction is known. See for instance the aforementioned article by William McMurray in IEEE, Vol. IA-8, No. 3, May, June, 1972. See also: C. Boisdon and M. Boidin, "Reactive Power Static Compensation and Harmonic Filtering in a Metal Industry Plant", pp. 945–960 in "Control in Power Electronics and Electrical Drives", Proceedings of Symposium in Dusseldorf 3-5 October, 1977 edited by W. Leonhard. However, the special character of the "per bridge" and "per half-bride" modes of control according to the present invention will appear from the preceeding description as well as from the following considerations.

Figure 15:
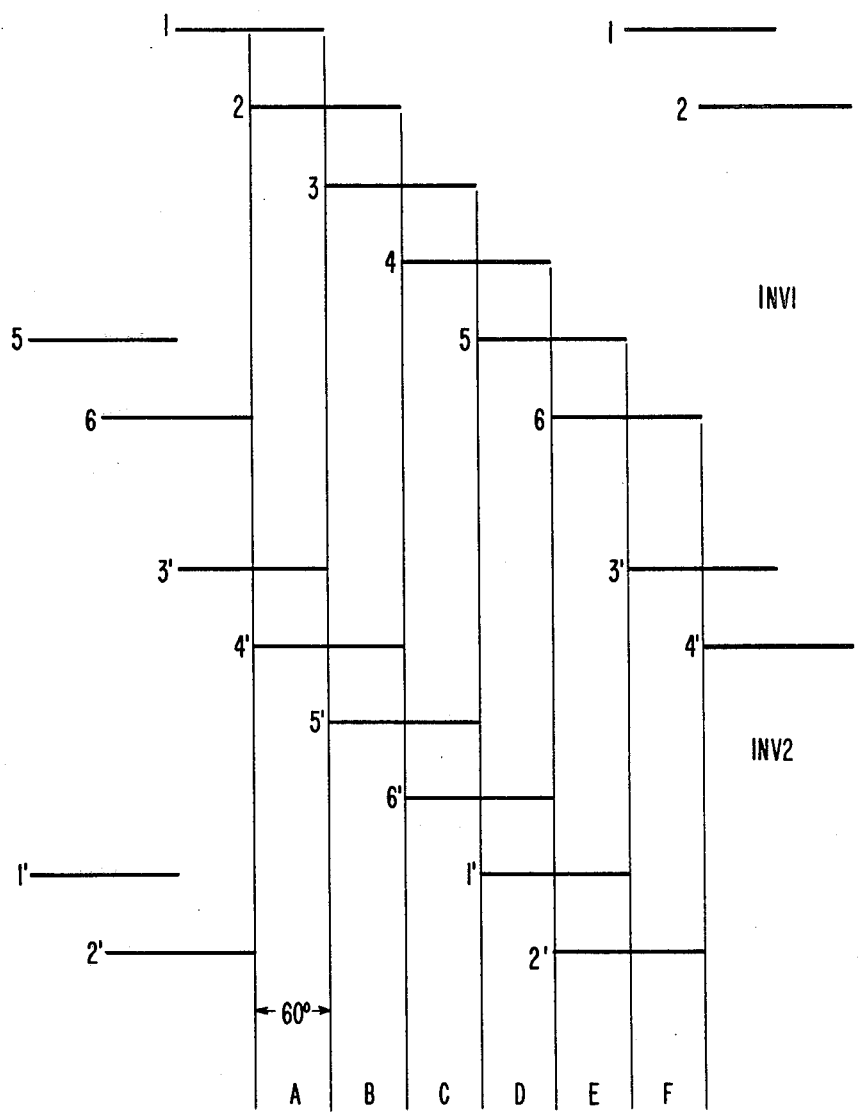
FIGS. 15 and 16 illustrate as a function of time the sequence of conduction of the various thyristors in the "per bridge" mode of FIG. 13 and in the "per half-bridge" mode of FIG. 14, respectively.

Referring to FIG. 15, the periods of conduction in the "per bridge" mode of thyristors (1-6) of inverter $INV_1$ and of thyristors (1'-6') of inverter $INV_2$ are shown for gating angles of 150° ($INV_1$) and 30° ($INV_2$), respectively, thus with a 120° shift between curves (a) of FIG. 13 and the corresponding curves (b) of FIG. 13. FIGS. 17A-F show six successive time intervals A-F representing concurrent conduction during 60° of four thyristors, two belonging to one inverter, two belonging to the other inverter.

Figure 16:
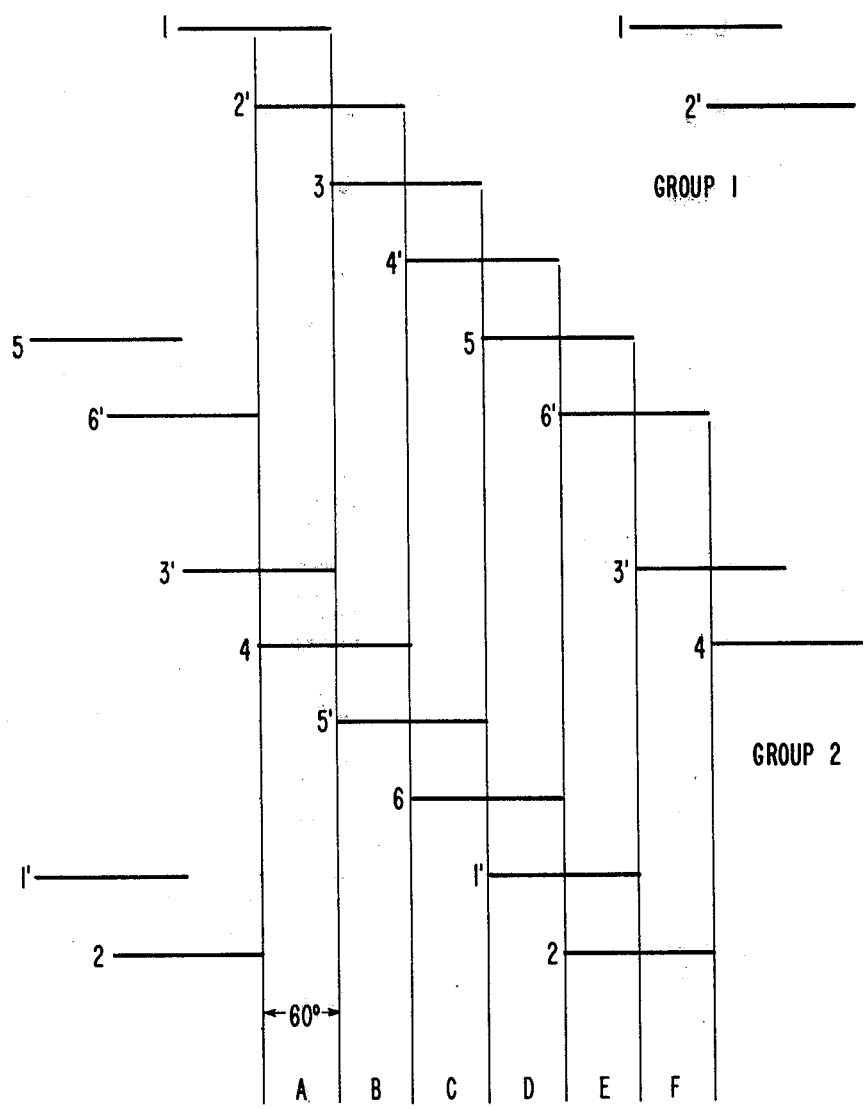

Referring to FIG. 16, the "per half-bridge" mode of control is illustrated by similar successive time intervals A-F of 60° each indicating concurrent conduction of four thyristors belonging by pairs to two different groups of six thyristors, each group associating half the thyristors of one inverter to another half of the other inverter. Thus, as shown in FIG. 12, thyristors 4, 6, 2 of $INV_1$ and 1', 3', 5' of $INV_2$ form group #1, which is controlled at a fixed firing angle of 150°, whereas thyristors 1, 3, 5 of $INV_1$ and 4', 6', 2' of $INV_2$ form group #2 which is controlled as a function of motor speed between 180° (in practice 150°) and 0°. FIGS. 18A-F indicate for time intervals A-F, each of 60°, concurrent conduction of four thyristors, two in group #2 and two in group #1.

Figure 17C:
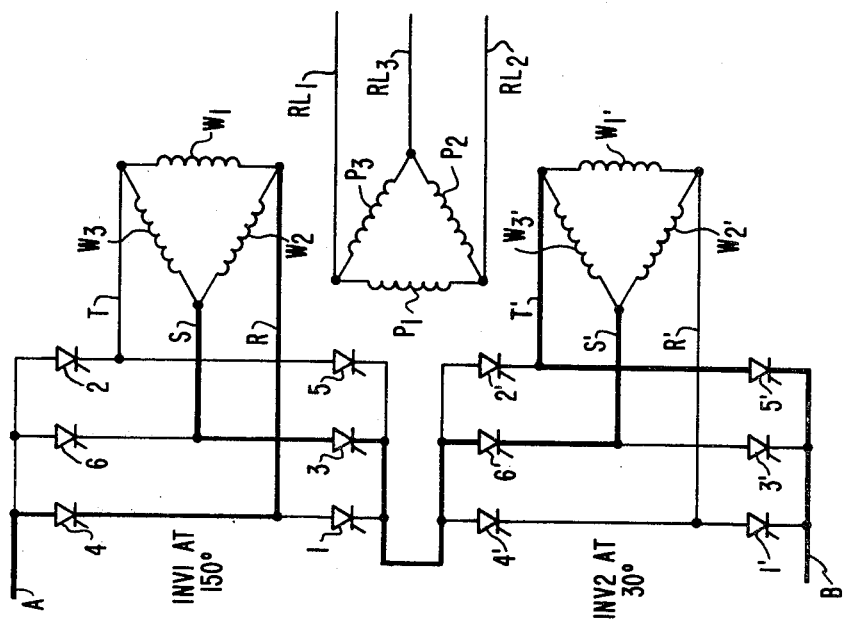
FIGS. 17A–F illustrate the operation of the two serially connected inverters for six sequentially fired thyristors in a "per bridge" mode of control, for six successive 60° time intervals.
Figure 17B:
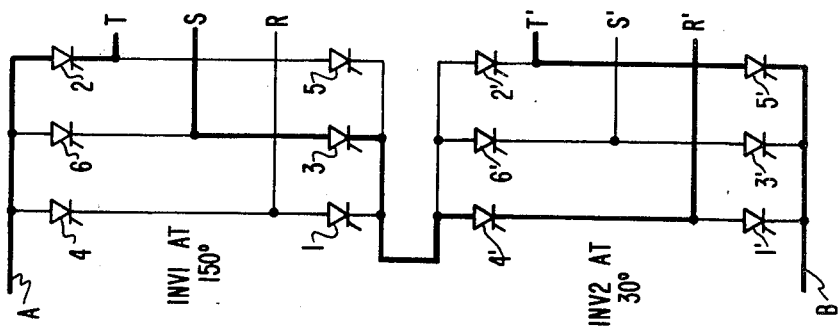
Figure 17A:
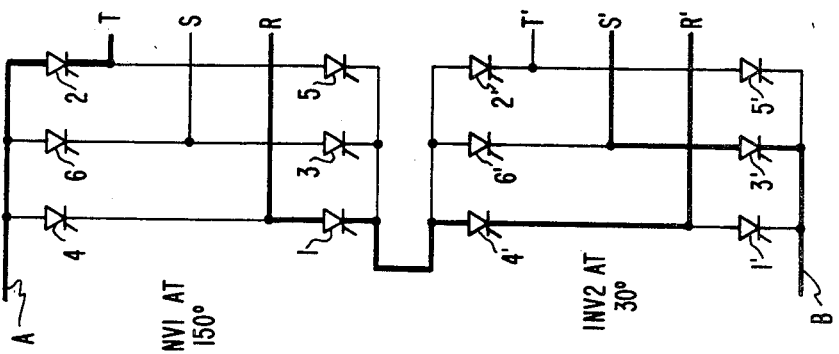
Figure 17F:
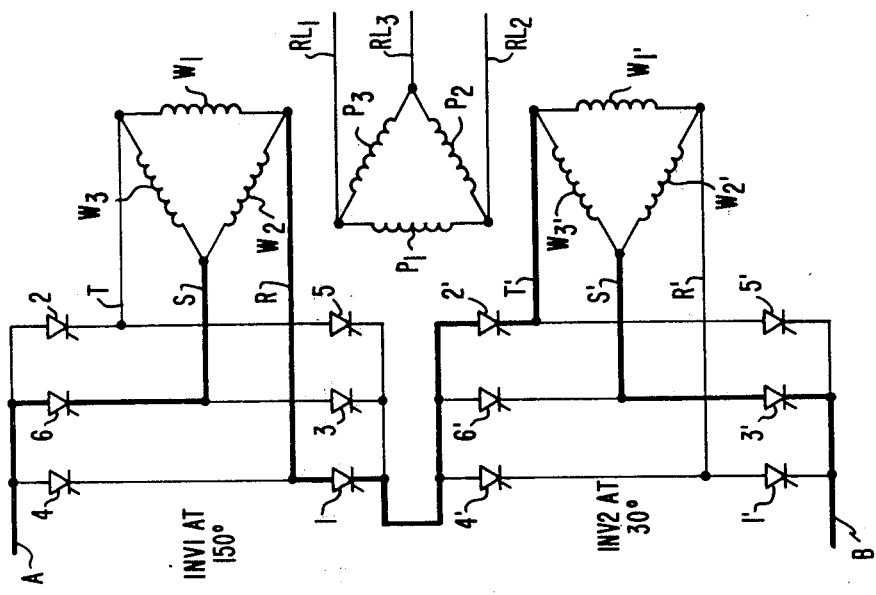
Figure 17E:
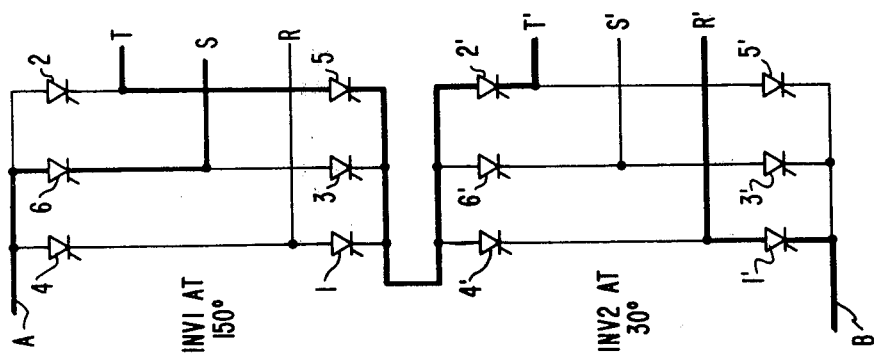
Figure 17D:
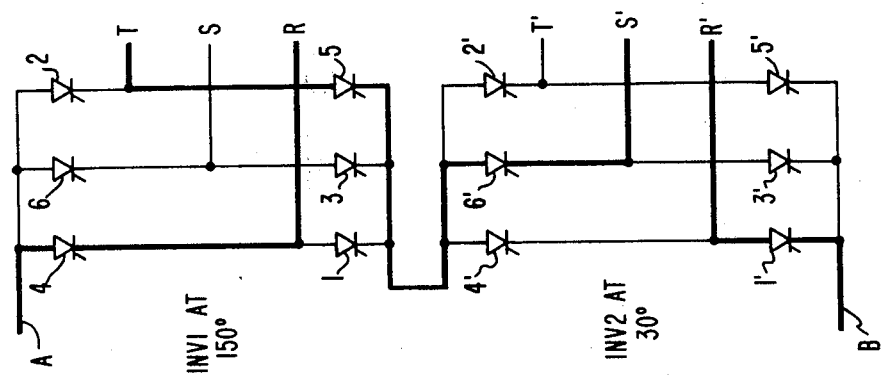

Considering FIG. 17A more specifically and in association with FIG. 13, it appears that winding $W_1$ of secondary $SC_1$ passes a current of 10 amperes from line T to line R, while winding $W'_2$ of secondary $SC_2$ also carries 10 amperes from line R' to line S', as thyristors 1, 2, 3' and 4' are conducting during time interval A. At the same time, as shown by FIG. 19, the delta-connected secondary $SC_1$ exhibits 5 amperes through the two windings $W_2$, $W_3$ which are together connected in series and disposed in parallel to winding $W_1$ between lines T and R. Similarly, in secondary $SC_2$, winding $W'_2$ has 10 amperes while a current of 5 amperes is by-passed through windings $W'_1$ and $W'_3$ from lines R' to line S'.

By permutation in the order of firing of thyristors 1–6 for $INV_1$, and 1'–6' for $INV_2$, it is easily established that currents in windings $W_1$–$W_3$ and $W'_1$–$W'_3$, are also either 10A, or 5A, for the successive time intervals B–F (FIGS. 17B–17F) as shown by curves (a) and (b) of FIG. 13.

FIGS. 19A, 19B, and 19C show the current distribution in the secondaries $SC_1$, $SC_2$ and in the primary windings $P_1$, $P_2$, $P_2$ of primary PM, for time intervals A, B, and C. FIGS. 19A, 19B and 19C indicate that the primary reflects exactly the current distribution of each of the secondaries $SC_1$, $SC_2$. This demonstrates that transformer TNF has a lower rating due to asymmetrical gating of the two inverters $INV_1$, $INV_2$ respectively coupled to secondaries $SC_1$, $SC_2$. Indeed, FIGS. 13, 15, 17A–F and 19 are in the context of 150° and 30°, e.g. of a 120° phase shift by asymmetric gating. It will be observed that a reduction in the phase shift angle from 120° to 0° between curves (a) and (b) of FIG. 13 will tend to increase the combined primary current (curves (c) of FIG. 13), whereas a maximal asymmetrical gating would minimize the resulting primary current. Nevertheless, it is typical of a fan or pump load, like shown with FIG. 8, that at low speed the torque is minimal, thus, the current reflected back into the transformer TNF is negligible. Therefore, while the thyristors $INV_1$ and $INV_2$ are being controlled from zero speed to full speed, as explained earlier by reference to FIG. 6, e.g. from no phase shift at all (both inverters at 150° for instance) up to maximum phase shift (150°–30°, for instance), the current in the primary will be minimal most of the time and reach its maximum when close to full speed. Therefore, the beneficial effect of asymmetrical gating is derived when it is most needed, that is in the very example just described by reference to FIGS. 13, 17A–F and 19, e.g. for 150°–30° respective gating angles.

Figure 18C:
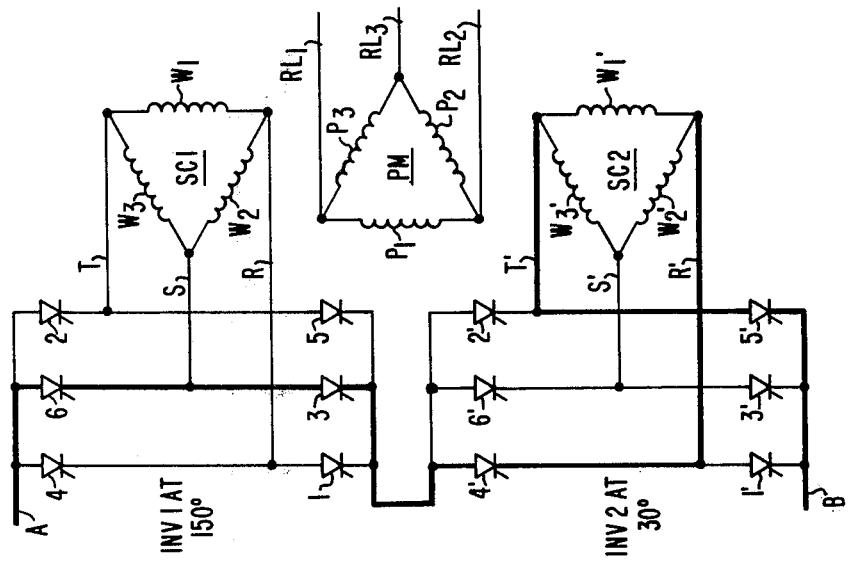
FIGS. 18A–F are like FIGS. 17A–F, except that control of the six thyristors is illustrated for the "per half-bridge" mode.
Figure 18B:
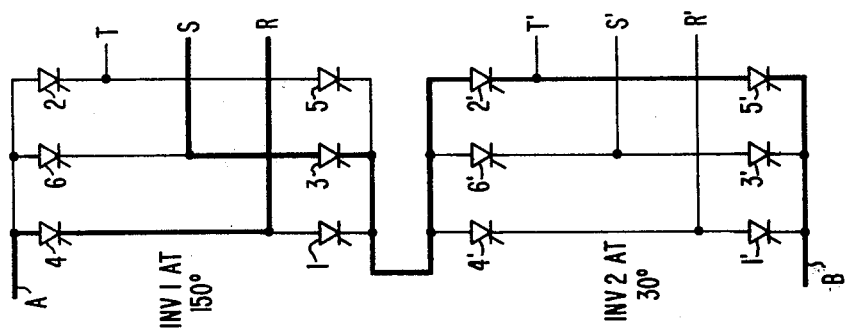
Figure 18A:
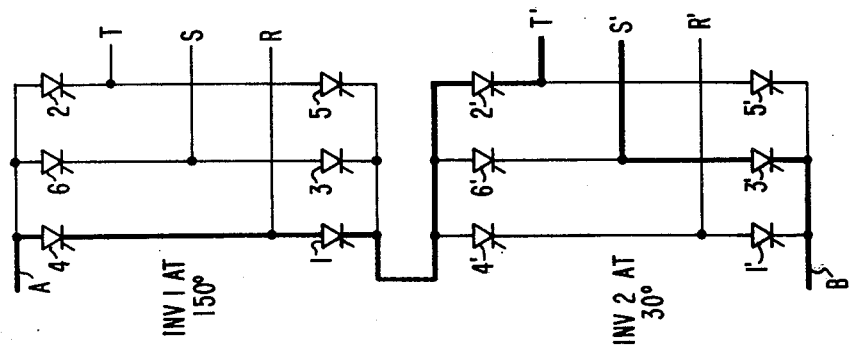
Figure 18F:
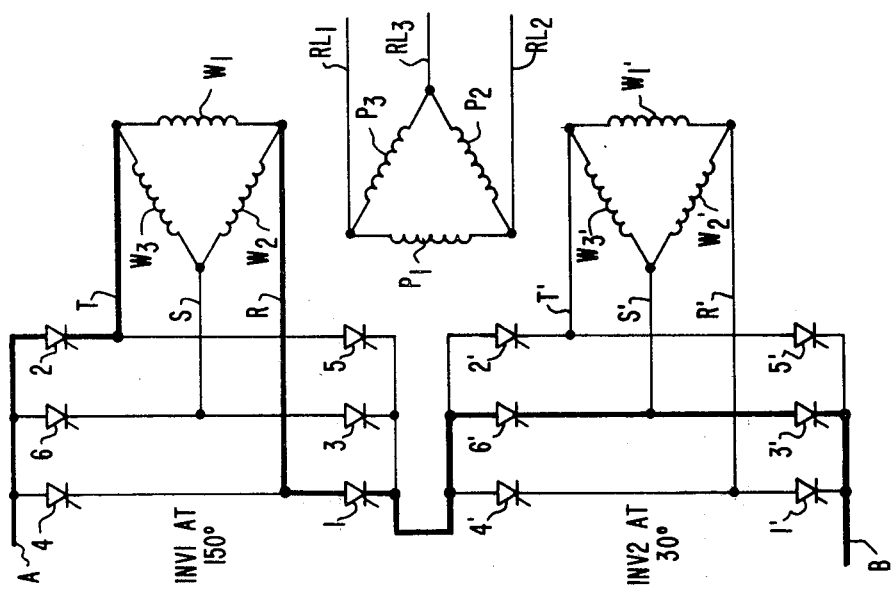
Figure 18E:
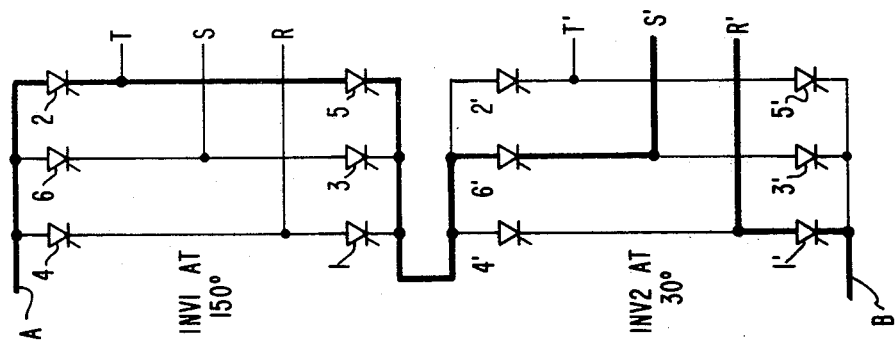
Figure 18D:
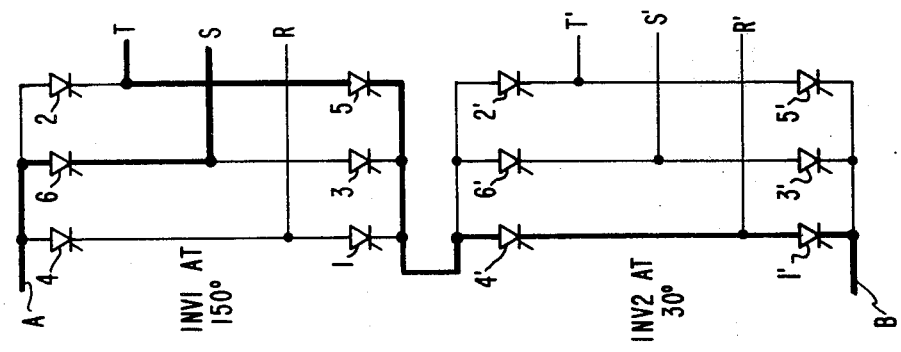

Referring to FIG. 18A in the "per half-bridge" mode, when thyristor 2' is fired at 30° in group #2 following thyristor 1, while thyristor 4 is being fired at 150° in group #1 following thyristor 3', there is concurrent conduction in interval A between thyristors 4 and 1 of inverter $INV_1$ and between thyristors 2' and 3' of inverter $INV_2$. As a result, between the DC link terminals A, B, current flows directly into inverter $INV_1$ by-passing completely all the windings $W_1$, $W_2$, $W_3$ of secondary $SC_1$, whereas current (10 amperes for instance) flows in winding $W'_3$ of secondary $SC_2$ by lines T', S' into the second inverter $INV_2$. Like in the instance of FIG. 17A, current also flows in parallel through windings $W'_2$, $W'_1$ (half the value because of the double resistance of the path, thus 5 amperes). Similar by-passes of one secondary or the other, $SC_1$ or $SC_2$, during alternate time intervals B to F are observed. The overall distribution of current in the secondary and primary windings are like shown in FIG. 20 where, in accordance with FIG. 14, the current passing through one winding is illustrated as 10A while current passes in the two other windings which is 5A. The situation is the same as in the "per bridge" mode for one of the secondaries and for the primary. However, with the "per half-bridge" mode of gating, alternatively, one secondary ($SC_1$ or $SC_2$) is totally by-passed when the other ($SC_2$ or $SC_1$) has current. The situation in the active secondary is exactly reflected in the current distribution of the primary winding PM, as shown in FIG. 20. Thus, the rating of transformer TNF is even more reduced by asymmetrical gating in the "per half-bridge" mode. It appears that each individual winding ($W_1$, $W_2$ or $W_3$) in $SC_1$ or ($W'_1$, $W'_2$ or $W'_3$) in $SC_2$ passes successively zero, 5A, zero, 5A, zero and 10A in the succession of time intervals such as A–F, e.g. has no current half of the time, has half the rating $\frac{1}{3}$ of the time, and has the full rating 1/6 of the time. This is a further improvement to the rating reduction due to a 120° asymmetrical gating such as earlier explained in the instance of "per bridge" mode for close to full speed in a fan or pump load. The same observation as made before can be made for the "per half-bridge" mode when the motor drive is controlled toward zero speed, e.g. with minimal torque, or current on the rotor. The conclusion is, here again, that asymmetric gating is most beneficial at full speed with this type of load, namely when the asymmetry is maximized.

The invention has been shown in the context of slip-recovery effected on a DC link including a rectifier RCT. However, it has been shown that thyristors might be used instead of diodes in the rectifier unit (see P. Zimmermann, "Super-Synchronous Static Converter Cascade", pp. 559–566 in "Control in Power Electronics and Electrical Drives" Proceeding of IFAC Symposium in Dusseldorf 3-5 October, 1977, edited by W. Leonhard). The present invention is applicable with such a modified rectifier unit on the rotor of the induction motor of FIGS. 4 and 12.

I claim:

1. In a slip-recovery AC motor drive comprising an induction motor having a stator and a rotor; an AC power supply for said stator; an AC/DC converter coupled with said rotor for providing a DC link between terminals; one array of static controlled power devices connected between said DC link terminals and said power supply through a transformer, the combination of:

first and second secondaries and a common primary forming said transformer;

another array of static controlled power devices connected between said DC link terminal and said power supply through said transformer;

said one and another array being connected in series between said DC link terminals, each of said arrays consisting of a bridge of thyristors providing a DC voltage and an AC current for a corresponding one of said secondaries;

the thyristors of said bridges being divided into two groups of opposite polarities per bridge;

a first group of one polarity in one bridge and a first group of the other polarity in the other bridge being controlled under a common firing angle;

a second group of the other polarity in said one bridge and a second group of said one polarity in said other bridge being controlled under a common firing angle;

asymmetrical gating means for controlling said first and second array to create a continuously varying phase shift between the AC currents of said arrays;

said common primary combining the effects of said first and second secondaries in response to control by said asymmetrical gating means.

2. The AC motor drive of claim 1 with the common firing angle of one of said first and second groups being substantially close to 180°, and the common firing angle of the other of said first and second groups being selected to be between 0° to substantially close and 180° as a function of motor speed.

3. The AC motor drive of claim 2 with said motor being coupled to a fan load.

4. The AC motor drive of claim 2 with said motor being coupled to a pump load.

5. The AC motor drive of claim 1 with said first and second inverters having the same rating, with said secondaries being identical.

6. The AC motor drive of claim 5 with said first and second secondaries having respective windings wound in opposition relative to one another.

7. The AC motor drive of claim 1 with said power supply, transformer and induction motor having three phases, each of said inverters having a three-phase output, and the associated secondary having three windings.

8. The AC motor drive of claim 7 with said secondaries and primary of said transformer being Y connected.

9. The AC motor drive of claim 7 with said secondaries and primary of said transformer being delta connected.

10. The AC motor drive of claim 1 with said AC/DC converter including an array of diodes for rectifying the alternating current from said rotor.

11. The AC motor drive of claim 1 with said AC/DC converter including an array of thyristors operated to rectify the alternating current from said rotor.

12. A slip-recovery AC motor drive comprising an induction motor having a stator and a rotor, a polyphase AC power supply for said stator, means for rectifying the output from said rotor to provide a DC voltage between DC terminals, first and second thyristor inverters connected in series between said DC terminals for returning energy from said rotor to said power supply through a polyphase transformer, said transformer having two identical secondaries associated with said first and second inverters, respectively, and a common primary connected to said power supply; said first and second inverters being controlled during successive equal time intervals of conduction for alternately passing current in one secondary and by-passing the other secondary between said DC terminals.

* * * * *